United States Patent

Staub

[15] 3,677,338
[45] July 18, 1972

[54] SURFACE CONDENSER

[72] Inventor: Fred W. Staub, Scotia, N.Y.
[73] Assignee: General Electric Company
[22] Filed: Feb. 17, 1971
[21] Appl. No.: 116,068

[52] U.S. Cl..............................165/111, 165/122, 165/146, 165/181
[51] Int. Cl.........................................F28b 1/06
[58] Field of Search...................165/111, 147, 110, 146, 181

[56] References Cited

UNITED STATES PATENTS

| | | | |
|---|---|---|---|
| 3,073,575 | 1/1963 | Schulenberg | 165/111 X |
| 3,223,152 | 12/1965 | Schulenberg | 165/146 |
| 3,543,843 | 12/1970 | Gunter | 165/111 |

FOREIGN PATENTS OR APPLICATIONS

| | | | |
|---|---|---|---|
| 361,018 | 5/1962 | Germany | 165/146 |

*Primary Examiner*—Albert W. Davis, Jr.
*Attorney*—Paul A. Frank, John F. Ahern, Julius J. Zaskalicky, Frank L. Neuhauser, Oscar B. Waddell and Joseph B. Forman

[57] ABSTRACT

In a surface condenser including a plurality of parallel tubes arranged in a plurality of parallel rows between an inlet and an outlet manifold for condensing a vaporous medium by a stream of coolant, freeze-up of the tubes is prevented and improved performance is provided by selectively finning the tubes. The tubes in the row adjacent the upstream end of the stream of coolant are finned along a section adjacent the outlet manifold. Rows progressively farther removed from the upstream end of the coolant are finned in sections located progressively closer to the inlet manifold. Sections located progressively closer to the inlet manifold are progressively longer. Accordingly, uniform flow of coolant on the outside surfaces of the tubes and a balanced flow of vaporous medium through the tubes are provided, and in addition contact between excessively low temperature coolant and tubes containing insufficient vapor is prevented.

8 Claims, 4 Drawing Figures

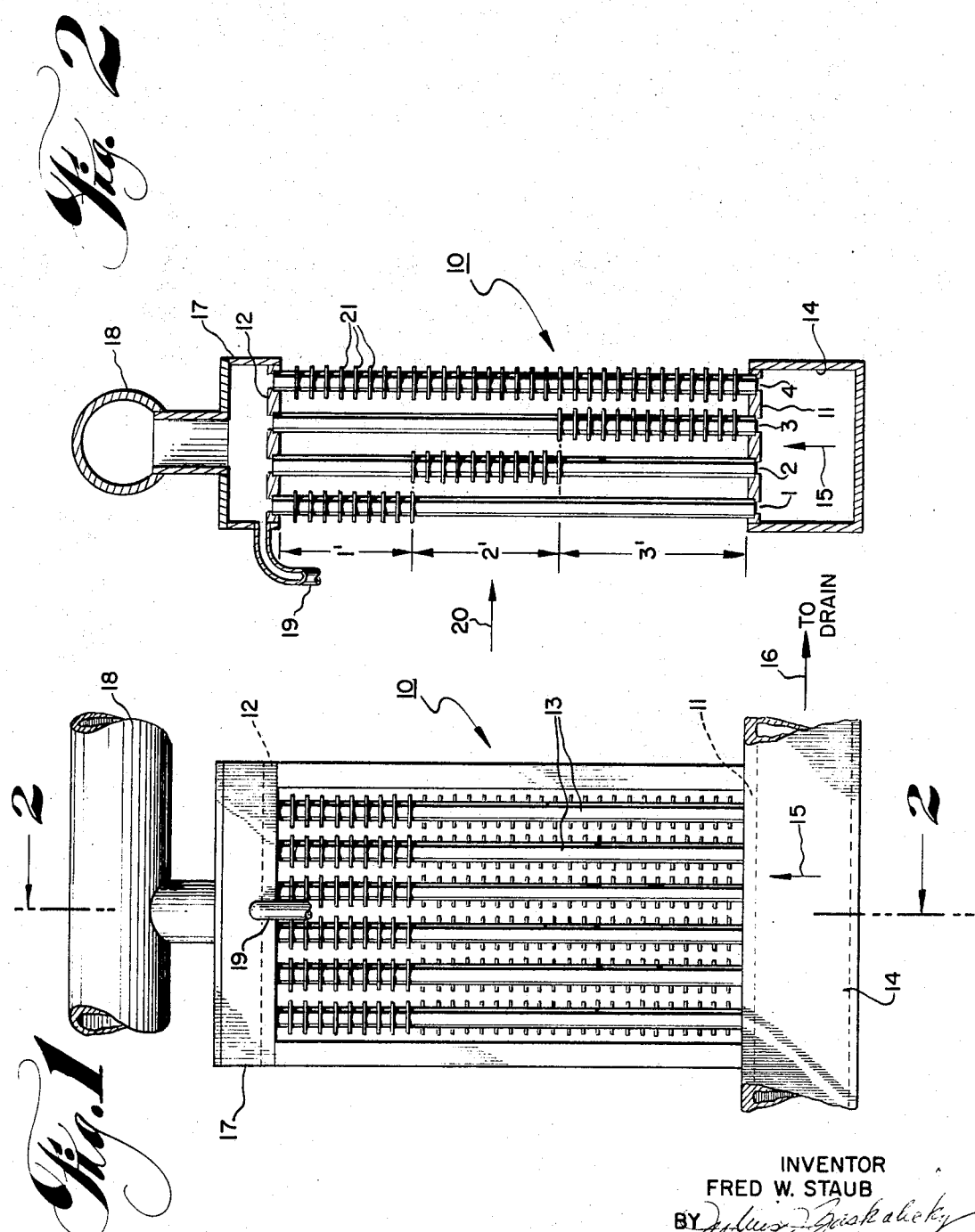
Patented July 18, 1972  3,677,338
2 Sheets-Sheet 1
INVENTOR
FRED W. STAUB
BY
HIS ATTORNEY

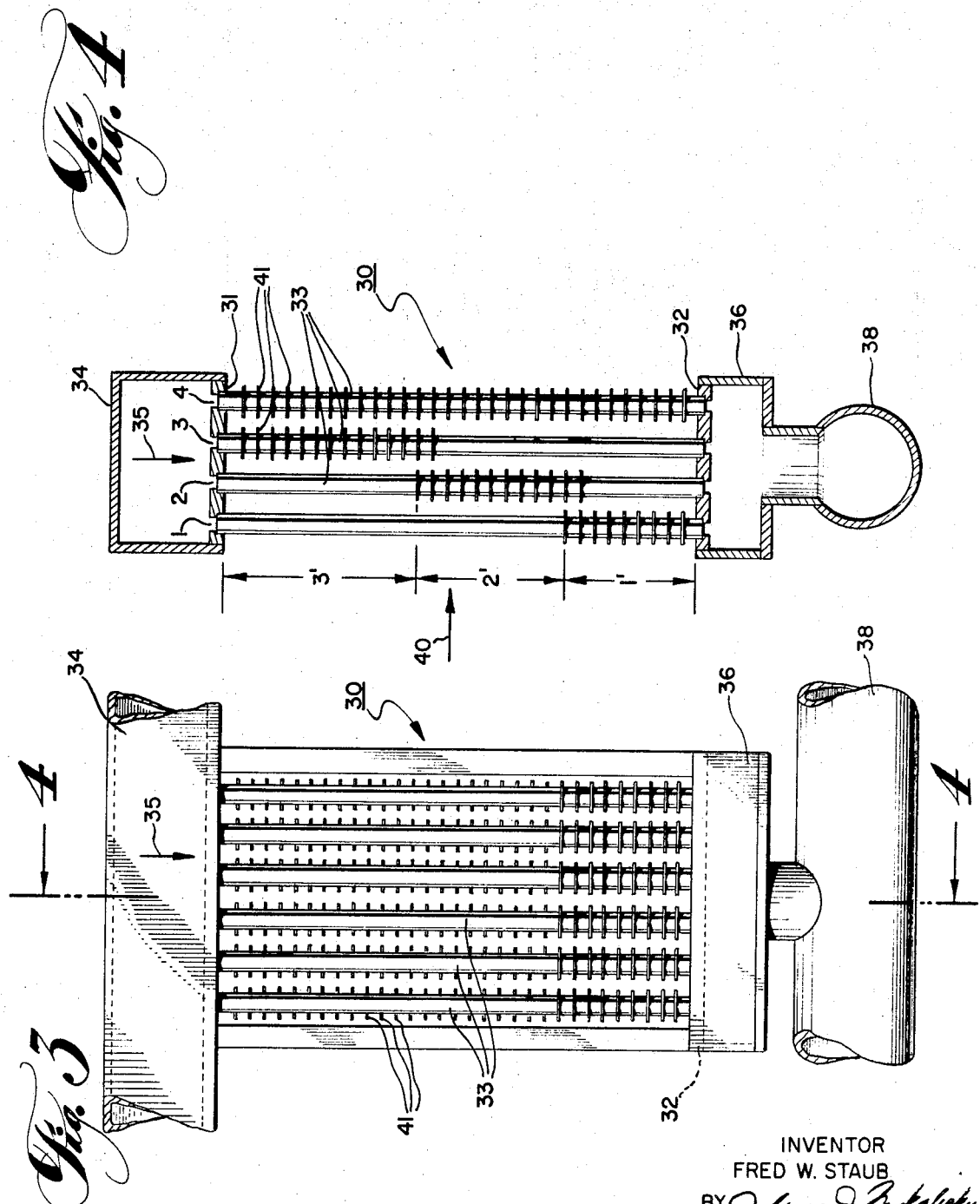

SURFACE CONDENSER

The present invention relates to condensers in general and more particularly to a surface condenser for steam and similar vaporous media which is cooled by atmospheric air or other coolant whose temperature can be lower than the freezing temperature of the fluid being condensed.

Such a surface condenser includes a plurality of parallel tubes arranged in a plurality of parallel rows between an inlet and an outlet manifold. The air flow is normally uniformly perpendicular to the planes of the rows and the air is heated as it passes through the condenser. As a result, a lower condensating rate occurs in each successive tube along the direction of flow of coolant with consequent lower pressure drop in successive rows of tubes. In upflow condensers the vapor flows upward and some condensate as well flows upward. Since equal pressure drop must occur between the bottom or inlet manifold and the top or outlet manifold, condensate and vapor will normally pass through the rows beyond the first row and enter the top of the tubes of the first row. Such flow paths inhibit flow in the tubes of the first row and traps air therein which further reduces condensing rates. Accordingly, condensate formed in the tubes or flowing therein from the tubes in the rows beyond the first row flows down the tubes of the first row, freezes when the cooling air is sufficiently below the condensate freezing temperature. The flow phenonemon occurring in connection with the first row of tubes also occurs in connection with tubes of the other rows but is not as significant as usually the cooling air impinging on those tubes would be above the freezing temperature of the condensate. Nevertheless, such flow phenomenon will decrease the performance of some or all of the tubes in the other rows except the last row or two.

The present invention is directed to providing a condenser which avoids such freeze-up problems and which provides balanced coolant and vaporous media flow through the condenser with resultant balanced heat transfer in the condenser.

Accordingly, an object of the present invention is to provide a condenser having balanced coolant and vaporous media flow therethrough.

Another object of the present invention is to provide a surface condenser which is highly efficient and effective in condensing vaporous media by flow of coolant therethrough.

Another object of the present invention is to provide a heat exchanger which is compact.

A further object of the present invention is to provide a simple yet effective means to prevent and limit freeze-up of a surface condenser.

In accordance with an illustrative embodiment of the present invention, there is provided a surface condenser for condensing a stream of vaporous medium by a stream of coolant. There is provided an inlet manifold for inflow of the stream of vaporous media and an outlet manifold for outflow of the products of the condensation process. A plurality of conductive tubes are connected in parallel between the manifolds for passing the vaporous media from the inlet manifold to the outlet manifold. The tubes are arranged in a plurality of rows, the rows being adapted to be disposed in planes generally transverse or perpendicular to the direction of flow of the stream of coolant. The rows are consecutively numbered from the upstream end of the flow of coolant over the rows of tubes. Each tube is divided into a plurality of longitudinal sections equal in number to the number of rows. The sections of each tube are consecutively numbered from the end connected to the outlet manifold to the end connected to the inlet manifold. Each section of each tube having the same number is of the same length. Each section of each tube in each row having the same number as the number of the row in which it is located has a surface heat transfer means connected to it. Each of the tubes in a row have the same heat transfer surface. The heat transfer surface of the heat transfer means increasing with the row number to provide substantially the same condensing side pressure drop for all of the tubes.

The novel features which are believed to be characteristic of the present invention are set forth in the appended claims. The invention itself, however, together with further objects and advantages thereof may best be understood by reference to the following description taken in connection with the accompanying drawings in which:

FIG. 1 is a front view of a surface condenser assembly embodying the present invention;

FIG. 2 is a side view of the condenser assembly of FIG. 1;

FIG. 3 is a front view of a surface condenser assembly of the downflow variety showing another embodiment of the present invention;

FIG. 4 is a side view of the condenser assembly of FIG. 3.

Referring now to FIGS. 1 and 2, there is shown a surface condenser assembly 10 of the upflow variety in which a vaporous medium such as steam is condensed by a stream of coolant such as air comprising a lower base plate 11 and an upper base plate 12 between which are mounted a plurality of condenser tubes 13. A supply or inlet manifold 14 is mounted to the lower base plate 11 to provide steam to the lower openings of the tubes as indicated by arrow 15. The inlet manifold 14, in turn, is supplied by a distribution conduit which may be an extension of the manifold 14, as shown. Condensate collected in the manifold 14 flows as indicated by arrow 16 to a suitable drain point for reuse. An outlet or receiving manifold 17 is mounted to the upper base plate 12 to collect the upward flowing products of condensation and includes gases, vapors and liquids. The gaseous and vapor products are withdrawn by an evacuating device (not shown), such as an air ejector, connected to the conduit 18 which connects with manifold 17. Also located in the outlet manifold adjacent the upper base plate is a duct 19 for the removal of condensate flowing from the outlet ends of the tubes 13. A plurality of condenser assemblies such as shown in FIGS. 1 and 2 may be mounted in banks to obtain the cooling capacity need. Also, each of the condenser assemblies may be inclined to the vertical and cooling air may be directed over the external surfaces of the tubes 13 by convection, or by forced cooling by fans (not shown).

The tubes 13 are connected in a plurality of rows with the axes of each of the tubes in a row lying in a plane. The planes of each of the rows of tubes are parallel and disposed in a direction generally perpendicular to the direction of flow of coolant air across the external surfaces of the condenser as indicated by the arrow 20. The rows of tubes 13 are consecutively numbered from 1 to 4 starting from the upstream end of the air flow stream. The tubes in each of the rows except the last are divided into the same number of sections as the number of rows involved, for example, in the embodiment of FIGS. 1 and 2 this number would be three. Sections of each tube are consecutively numbered 1', 2', 3' from the outlet manifold end to the inlet manifold end. Each section of each tube having the same number is of the same length. The sections having the same number as the row in which they are located are provided with a surface heat transfer means. The surface heat transfer means is in the form of a plurality of fins 21 of the same shape and size, and uniformly distributed along the length of the sections. The lengths of the sections, and accordingly, the heat transfer surface thereof, increase with the number of the row in which they are located so that the pressure drop in the tubes of each of the rows is substantially the same. With the provision of such variable heat transfer surfaces, vaporous medium cross flows through the outlet manifold, particularly from higher numbered rows to the first row of tubes is eliminated or at least minimized.

The steam in the tubes of row 1 is not appreciably cooled until it reaches the first or upper section 1' of the tubes at which time it is cooled, condensate is formed and the residual products such as air along with possibly some condensate is passed on into the outlet manifold. Similarly, steam flowing in the tubes of row 2 upon reaching the middle or second section 2' of the tubes is subjected to cooling air of the same temperature and it undergoes essentially the same cooling process, with condensate flowing back down through the tubes and some condensate and residual gaseous products flowing into the outlet manifold. As the pressure drops in the tubes of row 2 must be substantially the same as the pressure drop in the tubes of row 1 to minimize cross flows and as tubes of the row 1 have a larger initial unfinned section, the length of the section 2' is increased to provide equal pressure drop in the tubes of rows 1 and 2. Similarly, steam flowing in the third section 31 of the tubes of row 3 is subjected to cooling air of the same temperature and the steam undergoes essentially the same cooling process, with condensate flowing back down through the tubes and residual products flowing into the outlet manifold. As the pressure drop in the tubes of row 3 must be substantially the same as the pressure drop in the tubes of row 2 to minimize cross flows and as the tubes of row 2 have an initial unfinned section, section 3' is of a length greater than section 2' of row 2 to provide equal pressure drop in the tubes of rows 2 and 3. Accordingly, flow and injection of condensation products from the tubes of row 3 into the outlet ends of the tubes of rows 1 and 2 is avoided or at least minimized.

The cooling air in passing over section 1' of the tubes of row 1 is heated and then passed over the unfinned sections of the tubes of rows 2 and 3. Such air has been warmed sufficiently and would normally be above the freezing temperature of the condensate. Accordingly, it would not normally present a problem with respect to freezing of condensate in the tubes of rows 2 and 3, either flowing therein from the entrance end thereof or injected therein from adjacent tubes. Similarly, the coolant flowing along the intermediate or middle section of the condenser is warmed by section 2' of row 2 and consequently does not present a freezing danger to the unfinned section of the tubes of row 3. Also, while cooling air of low temperature passes over unfinned sections of tubes of the first and second rows normally such a condition would not pose a problem with respect to freeze-up of the condensate therein as full flow and pressure appears in these sections of the tubes of the first and second row and consequently adequate heat exists in the vaporous medium to more than maintain the temperature of the vaporous medium and the condensate above the freezing temperature of the condensate.

In order to provide pressure drop in the tubes of row 4 which is the same as in the tubes of the other rows and thereby to minimize cross flow from the outlet end of the tubes of the last row into tubes of the other rows, the tubes of row 4 are appropriately finned. Such finning may take the form of fins of a particular size and uniformly disposed along the length of the tube. The tubes of row 4 may be overfinned to assure that if any cross flow occurs, it occurs into the tubes of the last flow.

Referring now to FIGS. 3 and 4, there is shown a surface condenser assembly 30 of the downflow variety comprising an upper base plate 31 and a lower base plate 32 between which are mounted a plurality of condenser tubes 33 finned along the length thereof. A supply or inlet manifold 34 is mounted to the upper base plate 31 to provide vaporous medium such as steam to the upper openings of the tubes as indicated by the arrow 35. Inlet manifold 34 in turn is supplied by a distribution conduit which may be an extension of the manifold 34, as shown. An outlet or receiving manifold 36 is mounted to the lower base plate 32 to collect the products of condensation which may include gases, vapors and liquids. Gaseous and vapor products are withdrawn by an evacuating device (not shown) such an air ejector connected to the conduit 38 connected to the outlet manifold 36. Condensate flowing downward in the tubes 33 is collected in the manifold 36 and flows through the conduit 38 to a suitable drain point for reuse.

The tubes 33 are connected in a plurality of rows of the axes of each of the tubes in a row lying in a plane, the planes of each of the rows of tubes are parallel and disposed in a direction generally transverse or perpendicular to the direction of flow of coolant or air across the external surfaces of the condenser as indicated by the arrow 40. The rows are consecutively numbered from 1 to 4 starting from the upstream end of the airflow stream. The tubes in each of the rows except the last are divided into the same number of sections as the number of rows involved. For example, in the embodiment of FIGS. 3 and 4 this number would be three. Sections of each tube are consecutively numbered 1', 2' and 3' from the outlet manifold to the inlet manifold end. Each section of each tube having the same number is of the same length. The sections having the same number as the row in which they are located are provided with a surface heat transfer means. The surface heat transfer means is in the form of a plurality of fins 41 of the same shape and size, and uniformly distributed along the length of the sections. The lengths of the sections, and accordingly, the heat transfer surface thereof, increases with the number of the row in which they are located so that the pressure drop in the tubes in each of the rows is substantially the same. With the provision of such variable heat transfer surfaces, vaporous medium cross-flow through the outlet manifold, particularly from the higher numbered rows to the first row of tubes is eliminated or at least minimized.

In row 2 the finning on sections 2' of the row is extended downward slightly into section 1' thereof and similarly the finning on section 3' of the tubes of row 3 is extended downward to a small extent into sections 2' of the tube. Such extensions minimize or eliminate any bypass flow of cooling air around the finned sections of row 2 and row 3.

Steam in the tubes of row 1 is not appreciably cool until it reaches the first or lower section of tubes at which time it is cooled and condensate is formed. Such condensate and residual products such as air is collected in the outlet manifold 36. Similarly, steam flowing in the tubes of row 2 on reaching the middle or second section 2' of the tubes is subjected to cooling air of the same temperature and it undergoes the same cooling process with condensate flowing down through the tubes and is collected along with residual gas and vapor products in the outlet manifold 36. As the pressure drop in the tubes of row 2 must be substantially the same as the pressure drop in the tubes of row 1 to minimize cross flows and as the tubes of row 1 have a larger initial unfinned section, the length of the section 2' is made greater than the length of section 1' to provide equal pressure drop in the tubes of rows 1 and 2. Similarly, the third section 3' of the tubes of row 3 is subjected to cooling air at the same temperature and the steam undergoes essentially the same cooling process with condensate flowing down through the tubes and is collected along with residual gas and vapor products in outlet manifold. As the pressure drop in the tubes of row 3 must be substantially the same as the pressure drop in the tubes of row 2 to minimize cross flows and as the tubes of row 2 have an initial unfinned section 3' while the tubes of row 3 do not have such an unfinned section, the length of section 3' of row 3 is made greater in length than section 2' of row 2. As described in connection with the embodiments of FIGS. 1 and 2, the tubes of the fourth or last row are completely and uniformly finned to provide substantially the same pressure drop in the tubes thereof as in the tubes of the other rows. Tubes of row 4 may be over overfinned to assure that if any cross flow occurs it occurs in the tubes of the last row. Operation of the condenser of FIGS. 3 and 4 in other respects is similar to the operation of the condenser of FIGS. 1 and 2. The arrangement of the fins provides a uniform impedance to air flow across the tubes and the selective finning provides uniform pressure drop in the tube. The arrangement of the finning in the various rows minimizes the risk of freeze up in the tubes of the first row which are the critical tubes in the condenser.

While the invention has been described in specific embodiments, it will be appreciated that modifications may be made by those skilled in the art and I intend by the appended claims to cover all such modifications and changes as fall within the true spirit and scope of the invention

What I claim as new and desire to secure by Letters Patent of the United States is:

1. In combination, in a surface condenser for condensing a stream of vaporous medium by a stream of coolant, an inlet manifold for ingress of said stream of vaporous medium, an outlet manifold for egress of said vaporous medium, a plurality of conductive tubes connected in parallel between said manifolds for passing said vaporous medium from said inlet manifold to said outlet manifold, said tubes being arranged in a plurality of rows, said rows being adapted to be disposed in planes generally transverse to the direction of flow of said stream of coolant, said rows being consecutively numbered from the upstream end of the flow of coolant over said rows of tubes, each tube divided into a plurality of longitudinal sections equal in number to the number of said rows, the sections of each tube being consecutively numbered from the end of the tube connected to the outlet manifold to the end connected to the inlet manifold, each section of each tube having the same number being the same length, each section of each tube in each row having the same number as the number of the row in which it is located having connected thereto a surface heat transfer means, each of the surface heat transfer means connected to each of the tubes in a row being substantially the same, the heat transfer surface of the surface heat transfer means increasing with row number to provide substantially the same pressure drop for all of the tubes.

2. The combination of claim 1 in which said vaporous medium is steam and said coolant is air.

3. The combination of claim 1 in which said surface condenser is an upflow condenser.

4. The combination of claim 1 in which said surface condenser is a downflow condenser.

5. The combination of claim 1 in which said surface heat transfer means are fins, the form of each of the fins being the same and the distribution thereof along a section being uniform.

6. The combination of claim 1 in which the finned sections of adjacent tubes in adjacent rows overlap a short distance in the longitudinal direction to reduce bypass flow of coolant around finned sections of the tubes.

7. The combination of claim 1 in which an additional row of tubes is provided, each tube including surface heat transfer means and connected between inlet and outlet manifolds, said additional row being located in a plane parallel to the planes of the other rows of tubes of the condenser, adjacent to the last numbered row, and in the stream of coolant, each of the tubes of said additional row being proportional to provide substantially the same pressure drop to the flow of vaporous medium therethrough as each of the tubes of the other rows of the condenser.

8. The combination of claim 7 in which the tubes of said additional row have cooling fins connected thereto along the entire length thereof.

* * * * *